Dec. 16, 1924. Des.-Re. 15,970

E. J. RIDGWAY

PLATE OR SIMILAR ARTICLE

Original Filed Feb. 9, 1922

Inventor
Edward John Ridgway
by
Howson and Howson
his Attorneys

Reissued Dec. 16, 1924.

Design Re. 15,970

BEST AVAILABLE COPY

UNITED STATES PATENT OFFICE.

EDWARD JOHN RIDGWAY, OF STATEN ISLAND, NEW YORK.

DESIGN FOR A PLATE OR SIMILAR ARTICLE.

Original No. 62,035, dated March 6, 1923, Serial No. 624, filed February 9, 1922, for 3½ years. Application for reissue filed July 11, 1923. Serial No. 6,750½. Term of patent 14 years.

*To all whom it may concern:*

Be it known that I, EDWARD JOHN RIDGWAY, a subject of the King of Great Britain and Ireland, residing at Staten Island, in the county of Richmond, State of New York, have invented a new, original, and ornamental Design for a Plate or Similar Article, of which the following is a specification, reference being had to the accompanying drawing, forming part thereof.

Figure 1:
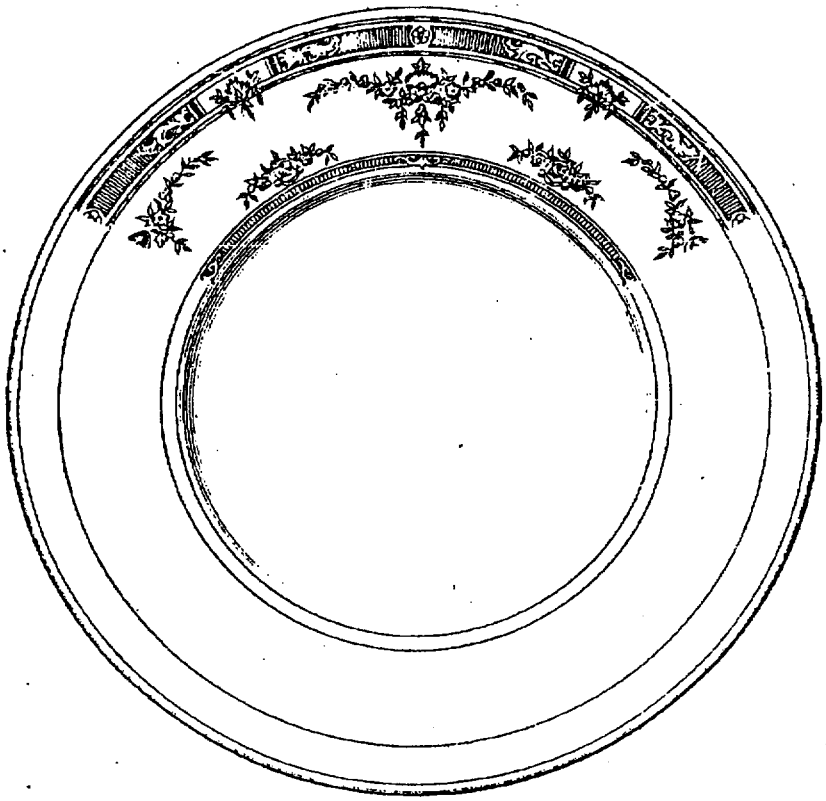
Figure 2:
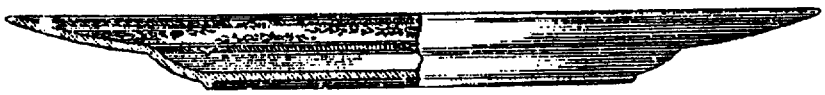

Figure 1 is a plan view of a plate showing my new design applied thereto, it being understood that the design is repeated around the entire circumference of the article; and Fig. 2 is a side elevation thereof, partially in section.

While the design is here shown applied to a plate, it is applied to articles of crockery and chinaware in general, and my invention is not limited to its application to a plate.

I claim:

The ornamental design for a plate or similar article as shown and described.

In testimony whereof I have signed my name to this specification.

E. JOHN RIDGWAY.